US011427687B2

(12) United States Patent
Glynn et al.

(10) Patent No.: US 11,427,687 B2
(45) Date of Patent: Aug. 30, 2022

(54) NOODLE COMPRISED OF A MATRIX OF DISCONTINUOUS FILAMENTS

(71) Applicant: The Boeing Company, Chicago, IL (US)

(72) Inventors: Andrew K. Glynn, North Melbourne (AU); David Andrew Pook, Melbourne (AU); Steve Georgiadis, Melbourne (AU); Samuel James Meure, Heatherton (AU); Max Marley Osborne, Melbourne (AU)

(73) Assignee: The Boeing Company, Chicago, IL (US)

( * ) Notice: Subject to any disclaimer, the term of this patent is extended or adjusted under 35 U.S.C. 154(b) by 127 days.

(21) Appl. No.: 16/718,086

(22) Filed: Dec. 17, 2019

(65) Prior Publication Data

US 2021/0253807 A1    Aug. 19, 2021

Related U.S. Application Data

(62) Division of application No. 14/812,458, filed on Jul. 29, 2015, now abandoned.

(51) Int. Cl.
*B29C 43/00* (2006.01)
*C08J 5/04* (2006.01)
(Continued)

(52) U.S. Cl.
CPC .............. *C08J 5/04* (2013.01); *B29C 43/003* (2013.01); *B29C 70/081* (2013.01); *B29C 70/46* (2013.01);
(Continued)

(58) Field of Classification Search
None
See application file for complete search history.

(56) References Cited

U.S. PATENT DOCUMENTS 5,188,778 A * 2/1993 Wallace ................ B29C 70/025
264/45.1
5,272,000 A * 12/1993 Chenoweth ............ D04H 1/435
442/35

(Continued)

FOREIGN PATENT DOCUMENTS

CN    103979099 A    8/2014
EP    2764987 A1    8/2014
(Continued)

OTHER PUBLICATIONS

Extended European Search report, dated Feb. 9, 2017, regarding Application No. 16170468.9, 12 pages.
(Continued)

*Primary Examiner* — Mohammad M Ameen
(74) *Attorney, Agent, or Firm* — Yee & Associates, P.C.

(57) ABSTRACT

A method and apparatus for manufacturing a filler for a composite structure. The apparatus may comprise a filler. The filler may comprise a fiber matrix that is uniform in all directions. The fiber matrix may comprise a first plurality of discontinuous filaments and a second plurality of discontinuous filaments. Each filament of the first plurality of discontinuous filaments may be comprised of a stiffening material. Each filament of the second plurality of discontinuous filaments may be comprised of a binding material. Discontinuous filaments of both the first plurality of discontinuous filaments and the second plurality of discontinuous filaments may be randomly oriented and entangled with each other.

20 Claims, 13 Drawing Sheets

(51) Int. Cl.
   B29C 70/46  (2006.01)
   B29C 70/08  (2006.01)
   B29C 70/50  (2006.01)
   B29K 105/12 (2006.01)

(52) U.S. Cl.
   CPC ........ *B29C 70/508* (2013.01); *B29K 2105/12* (2013.01); *C08J 2300/22* (2013.01); *C08J 2300/24* (2013.01)

(56) References Cited

U.S. PATENT DOCUMENTS

| | | | | |
|---|---|---|---|---|
| 5,376,327 | A | * | 12/1994 | Di Natale ............. B29C 70/305 264/121 |
| 5,579,609 | A | | 12/1996 | Sallee |
| 5,810,562 | A | * | 9/1998 | Byrnes .................. B64C 27/605 416/114 |
| 6,562,436 | B2 | * | 5/2003 | George ..................... B32B 5/12 428/105 |
| 6,689,448 | B2 | | 2/2004 | George et al. |
| 6,709,538 | B2 | | 3/2004 | George et al. |
| 2003/0148087 | A1 | * | 8/2003 | Hogfors Ziebell .... D04H 3/004 428/297.4 |
| 2009/0317587 | A1 | | 12/2009 | Deobald et al. |
| 2013/0171895 | A1 | | 7/2013 | Wolf et al. |
| 2013/0316131 | A1 | * | 11/2013 | Oefner .................. B29C 69/001 428/121 |
| 2014/0069586 | A1 | * | 3/2014 | Anderson ........... B32B 37/0046 156/499 |
| 2014/0216638 | A1 | * | 8/2014 | Vetter .................. B29C 70/081 156/227 |
| 2017/0029577 | A1 | | 2/2017 | Glynn et al. |

FOREIGN PATENT DOCUMENTS

| | | |
|---|---|---|
| EP | 2894025 A1 | 7/2015 |
| RU | 2013145432 A | 4/2015 |
| WO | WO2010144007 A1 | 12/2010 |

OTHER PUBLICATIONS

European Office Action, dated Aug. 23, 2019, regarding Application No. 16170468.9, 10 pages.

People's Republic of China Office Action and English translation, dated Aug. 2, 2019, regarding Application No. 20160605799.6, 18 pages.

Federal Institute of Industrial Property Office Action of the Substantive Examination and English translation, dated Aug. 27, 2019, regarding Application No. 2016118819/05(029571), 17 pages.

Office Action, dated Dec. 15, 2017, regarding U.S. Appl. No. 14/812,458, 21 pages.

Final Office Action, dated Jul. 12, 2018, regarding U.S. Appl. No. 14/812,458, 10 pages.

Office Action, dated Mar. 8, 2019, regarding U.S. Appl. No. 14/812,458, 12 pages.

Final Office Action, dated Sep. 13, 2019, regarding U.S. Appl. No. 14/812,458, 13 pages.

State Intellectual Property Office of PRC Notification of Third Office Action and English translation, dated Jul. 13, 2020, regarding Application No. 201610605799.6, 12 pages.

People's Republic of China Office Action and English translation, dated Feb. 6, 2020, regarding Application No. 201610605799.6, 17 pages.

* cited by examiner

NOODLE COMPRISED OF A MATRIX OF DISCONTINUOUS FILAMENTS

CROSS-REFERENCE TO RELATED APPLICATION

This application is a divisional of U.S. patent application Ser. No. 14/812,458, entitled "Noodle Comprised of a Matrix of Discontinuous Filaments", filed on Jul. 29, 2015; the entire contents of which are to be considered fully incorporated herein.

BACKGROUND INFORMATION

1. Field

The present disclosure relates generally to composite structures and, in particular, to fillers for filling voids in composite structures. Still more particularly, the present disclosure relates to fillers comprised of randomly oriented discontinuous filaments and a method and apparatus for manufacturing these types of fillers.

2. Background

Composite structures are being increasingly used in various platforms, such as, but not limited to, aircraft, unmanned aerial vehicles, and other types of aerospace vehicles. A composite structure may be comprised of at least one composite part made of composite material. In some cases, when two or more composite parts are joined together, channels or voids may be created along the bond lines between these composite parts. These voids may need to be filled in order to increase the strength of the bond. A filler may be used to fill this type of void.

As one example, in the aircraft industry, when a composite stiffener is mated with a composite skin panel, a filler may be used to fill the void created at the radius bond line between the composite stiffener and the composite skin panel. This type of filler may sometimes be referred to as a "composite filler," a "noodle," or a "composite noodle."

Currently used fillers are oftentimes made from materials, such as adhesive, prepreg tape, fabric, or other types of composite materials. Further, fillers are made to have a desired level of stiffness. For example, a filler used between a composite stiffener and a composite skin panel may need to have a certain level of thickness to transfer loads from the composite stiffener to the composite skin panel.

During the manufacturing and operation of an aircraft, composite fillers in the aircraft may experience various forces. These forces may cause undesired inconsistencies to form within these composite fillers. For example, cracks, delamination, and other undesired inconsistencies may develop within a composite material. These types of undesired inconsistencies may prevent the composite filler from transferring loads in the desired manner. Therefore, it would be desirable to have a method and apparatus that take into account at least some of the issues discussed above, such as, but not limited to, preventing cracks in composite fillers, as well as other possible issues.

SUMMARY

In one illustrative embodiment, an apparatus may comprise a filler. The filler may comprise a fiber matrix that is uniform in all directions. The fiber matrix may comprise a first plurality of discontinuous filaments and a second plurality of discontinuous filaments. Each filament of the first plurality of discontinuous filaments may be comprised of a stiffening material. Each filament of the second plurality of discontinuous filaments may be comprised of a binding material. Discontinuous filaments of both the first plurality of discontinuous filaments and the second plurality of discontinuous filaments may be randomly oriented and entangled with each other.

In another illustrative embodiment, a method for manufacturing a filler for a composite structure may be provided. A first plurality of discontinuous filaments may be mixed with a second plurality of discontinuous filaments to form a mixture. Feedstock material may be formed using the mixture. The feedstock material may be compressed to form a feedstock. Discontinuous filaments of the first plurality of discontinuous filaments and the second plurality of discontinuous filaments within the feedstock may be randomly oriented and entangled with each other to form a fiber matrix that is uniform in all directions. The feedstock may be shaped to form a filler structure for use in forming the filler.

In yet another illustrative example, a fiber matrix may comprise a first plurality of discontinuous filaments and a second plurality of discontinuous filaments. Each filament of the first plurality of discontinuous filaments may be comprised of a stiffening material. Each filament of the second plurality of discontinuous filaments may be comprised of a binding material. Discontinuous filaments of both the first plurality of discontinuous filaments and the second plurality of discontinuous filaments may be randomly oriented and entangled with each other such that the fiber matrix is uniform in all directions.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a method and apparatus for manufacturing a composite filler that results in the composite filler having a desired resistance to undesired inconsistencies, such as cracking. The illustrative embodiments recognize and take into account that a composite filler made up of randomly oriented discontinuous filaments that are comprised of a stiffening material and discontinuous filaments that are comprised of a binding material may help improve the stiffness, toughness, and stability of the composite filler.

Thus, the illustrative embodiments provide a method and apparatus for manufacturing a composite filler that comprises a fiber matrix that is uniform in all directions in three dimensions. In one illustrative example, the fiber matrix may comprise a first plurality of discontinuous filaments and a second plurality of discontinuous filaments. Each filament of the first plurality of discontinuous filaments may be comprised of a stiffening material and each filament of the second plurality of discontinuous filaments may be comprised of a binding material. Filaments of both the first plurality of discontinuous filaments and the second plurality of discontinuous filaments may be randomly oriented and entangled with each other.

Figure 1:
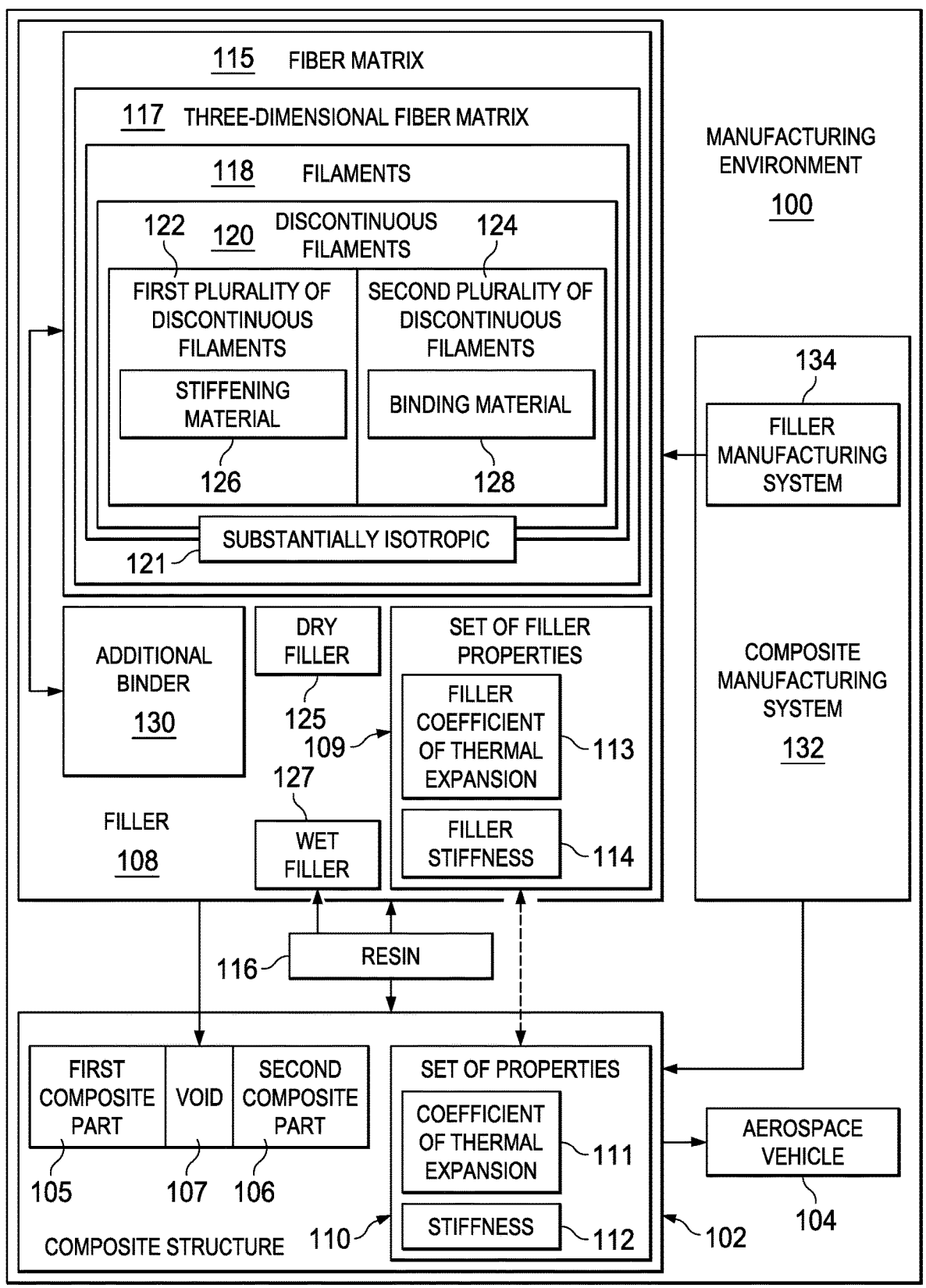
FIG. 1 is an illustration of a manufacturing environment in the form of a block diagram in accordance with an illustrative embodiment.

Referring now to the figures and, in particular, with reference to FIG. 1, an illustration of a manufacturing environment is depicted in the form of a block diagram in accordance with an illustrative embodiment. Manufacturing environment 100 may be an example of one environment in which composite structure 102 may be manufactured.

Composite structure 102 may be used in various different types of platforms. In one illustrative example, composite structure 102 may be used in aerospace vehicle 104. Aerospace vehicle 104 may take the form of an aircraft, a helicopter, an unmanned aerial vehicle, a space shuttle, a space vehicle, or some other type aerospace vehicle. In other illustrative examples, composite structure 102 may be used in a ground vehicle, a water vehicle, a building, or some other type of platform.

Composite structure 102 may be comprised of at least two composite parts. For example, without limitation, composite structure 102 may include first composite part 105 and second composite part 106. A composite part may be comprised of at least one of a ply, a resin-impregnated ply, a dry preform, a resin impregnated preform, or some other type or pre-manufactured article.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; or item B and item C. In some cases, "at least one of item A, item B, or item C" or "at least one of item A, item B, and item C" may mean, but is not limited to, two of item A, one of item B, and ten of item C; four of item B and seven of item C; or some other suitable combination.

In one illustrative example, first composite part 105 and second composite part 106 may be made from pre-impregnated fiber preforms. In another illustrative example, first composite part 105 and second composite part 106 may be made from dry fiber preforms or tacked together dry preforms that may be later infused with resin and cured to form a fully cured composite structure.

When first composite part 105 and second composite part 106 are mated together, void 107 may be formed between these two composite parts. Filler 108 may be used to substantially fill void 107. In some cases, filler 108 may also be referred to as a composite filler, a noodle, or a composite noodle.

In these illustrative examples, filler 108 may be formed such that filler 108 has set of filler properties 109 that substantially match the set of properties 110 of composite structure 102. For example, without limitation, set of properties 110 may include coefficient of thermal expansion 111 and stiffness 112. Filler 108 may be formed such that set of filler properties 109 includes filler coefficient of thermal expansion 111 and filler stiffness 114 that substantially match coefficient of thermal expansion 111 and stiffness 112, respectively, of composite structure 102. In these illustrative examples, filler 108 may be formed such that filler 108 also has properties that match set of properties 110 of composite structure 102. For example, without limitation, set of properties 110 may include at least one of toughness, density, or some other material property.

As depicted, filler 108 may be comprised of fiber matrix 115. In some cases, resin 116 may be infused in filler 108 prior to or after filler 108 is collocated with first composite part 105 and second composite part 106. Resin 116 may help toughen and strengthen filler 108. Fiber matrix 115 may take the form of three-dimensional fiber matrix 117. Fiber matrix 115 may be comprised of filaments 118. In this illustrative example, filaments 118 are discontinuous filaments 120. In some cases, discontinuous filaments 120 may also be referred to as chopped fibers.

Discontinuous filaments 120 may be fibers that do not extend the entire length or width of filler 108. Discontinuous filaments 120 may include filaments of different sizes, different diameters, different cross-sectional shapes, different types, or some combination thereof. In one illustrative example, each of discontinuous filaments 120 may have a length of about at least one millimeter.

Further, discontinuous filaments 120 may be randomly oriented relative to each other and entangled with each other such that fiber matrix 115 is substantially isotropic 121. Being substantially isotropic 121 means that fiber matrix 115 is uniform in all directions, within selected tolerances. In other words, fiber matrix 115 may be substantially invariant with respect to direction.

In one illustrative example, discontinuous filaments 120 may include first plurality of discontinuous filaments 122 and second plurality of discontinuous filaments 124. Each filament of first plurality of discontinuous filaments 122 may be comprised of stiffening material 126. Consequently, in some cases, first plurality of discontinuous filaments 122 may also be referred to as a plurality of discontinuous stiffening filaments. Each filament of second plurality of discontinuous filaments 124 may be comprised of binding material 128. Consequently, in some cases, second plurality of discontinuous filaments 124 may also be referred to as a plurality of discontinuous binding filaments.

The filaments of first plurality of discontinuous filaments 122 and second plurality of discontinuous filaments 124 may be randomly oriented and entangled with each other such that fiber matrix 115 is substantially isotropic 121. In other words, the filaments of first plurality of discontinuous filaments 122 and second plurality of discontinuous filaments 124 may be randomly oriented and entangled with each other such that fiber matrix 115 is uniform in all directions, within selected tolerances.

Stiffening material 126 may be comprised of one or more materials that contribute to filler stiffness 114. Stiffening material 126 may comprise, for example, without limitation, at least one of carbon, silica, glass, boron, a para-aramid synthetic fiber, a polyimide, a ceramic material, a metallic material or some other type of stiffening material.

Binding material 128 may be comprised of one or more materials that help bind discontinuous filaments 120 of filler 108 together. For example, binding material 128 may hold discontinuous filaments 120 together in response to at least one of heat, pressure, or a chemical reaction being applied to binding material 128. Binding material 128 may also hold discontinuous filaments 120 together during handling. Additionally, binding material 128 may be used to bind filler 108 to composite structure 102. Further, binding material 128 may help toughen, stiffen, and stabilize filler 108.

Binding material 128 may comprise, for example, without limitation, at least one of a thermoplastic material, a thermoset material, or some other type of binding material. A thermoplastic material may comprise, for example, without limitation, an acrylic material, a fluorocarbon, a polyamide, a polyolefin such as polyethylene or polypropylene, a polyester, a polycarbonate, a polyurethane, a polyaryletherketone, or some other type of thermoplastic material. A thermoset material may comprise, for example, without limitation, a polyurethane, a phenolic material, a polymide, a sulphonated polymer, a conductive polymer, a benzoxazine, a bismaleimide, a cyanate ester, a polyester, an epoxy, a silsesquioxane, or some other type of thermoset material.

In these illustrative examples, fiber matrix 115 may be used as filler 108 prior to infusing resin 116 within fiber matrix 115. In these examples, filler 108 may be referred to as dry filler 125. Dry filler 108 may be inserted within void 107.

In some cases, first composite part 105 and second composite part 106 may be dry preforms. After dry filler 125 is inserted into void 107, resin 116 may be infused within first composite part 105, second composite part 106, and dry filler 125 to form composite structure 102, which may then be cured. In some illustrative examples, the same or different types of resin may be infused within each of first composite part 105, second composite part 106, and dry filler 125.

In other cases, first composite part 105 and second composite part 106 may be pre-impregnated with resin 116 but uncured. After dry filler 125 is inserted into void 107, resin 116 may be infused within dry filler 125 located within void 107 to form composite structure 102, which may then be cured. Resin 116 may be the same or different from the resin impregnated within first composite part 105 and second composite part 106.

In other illustrative examples, resin 116 may be infused within fiber matrix 115 to form filler 108 prior to filler 108 being inserted within void 107. In these examples, filler 108 may be referred to as wet filler 127. As one illustrative example, resin 116 may be impregnated within fiber matrix 115. Resin 116 may help further toughen and strengthen filler 108. Once resin 116 has been infused within fiber matrix 115 to form wet filler 127, wet filler 127 may be positioned relative to first composite part 105 and second composite part 106 to fill void 107. Depending on the implementation, first composite part 105 and second composite part 106 may be dry preforms or resin-infused parts.

In this manner, resin 116 may be infused within filler 108 prior to the collocation of filler 108 with first composite part 105 and second composite part 106 during the manufacturing of composite structure 102. Alternately, resin 116 may also be infused within filler 108 after the collocation of filler 108 with first composite part 105 and second composite part 106 during the manufacturing of composite structure 102. The curing of composite structure 102 may be performed by applying at least one of heat, pressure, or a chemical reaction.

Resin 116 may comprise at least one of a thermoplastic material, a thermoset material, or some other type of material. Depending on the implementation, resin 116 may be comprised of multiple components, such as, for example, without limitation, at least one of a diluent, a catalyst, a monomer, an oligomer, a curative, particles, milled fibers, some other type of soluble or insoluble additive, or some other type of component.

The combination of discontinuous filaments 120 comprised of both stiffening material 126 and binding material 128, as well as fiber matrix 115 being substantially isotropic 121, may help strengthen filler 108 and make filler 108 resistant to undesired inconsistencies, such as cracking. For example, without limitation, filler 108 may be resistant to the cracking of resin 116 during curing, thermal cycling, or mechanical cycling.

In some illustrative examples, additional binder 130 may be added to fiber matrix 115 prior to resin 116. Additional binder 130 may be, for example, without limitation, injected into fiber matrix 115 or applied directly to discontinuous filaments 120 prior to the forming of the three-dimensional fiber matrix 117. Additional binder 130 may comprise at least one of, for example, without limitation, an adhesive material, a glue, a thermoplastic material, a polyetherimide, a thermoset material, or some other type of binding agent.

In one illustrative example, composite manufacturing system 132 may be used to manufacture composite structure 102. Filler manufacturing system 134 may be part of composite manufacturing system 132. In particular, filler manufacturing system 134 may be the portion of composite manufacturing system 132 used to manufacture filler 108. Filler 108 may be manufactured in different ways using filler manufacturing system 134. Composite manufacturing system 132 is described in greater detail in FIG. 2 below.

Figure 2:
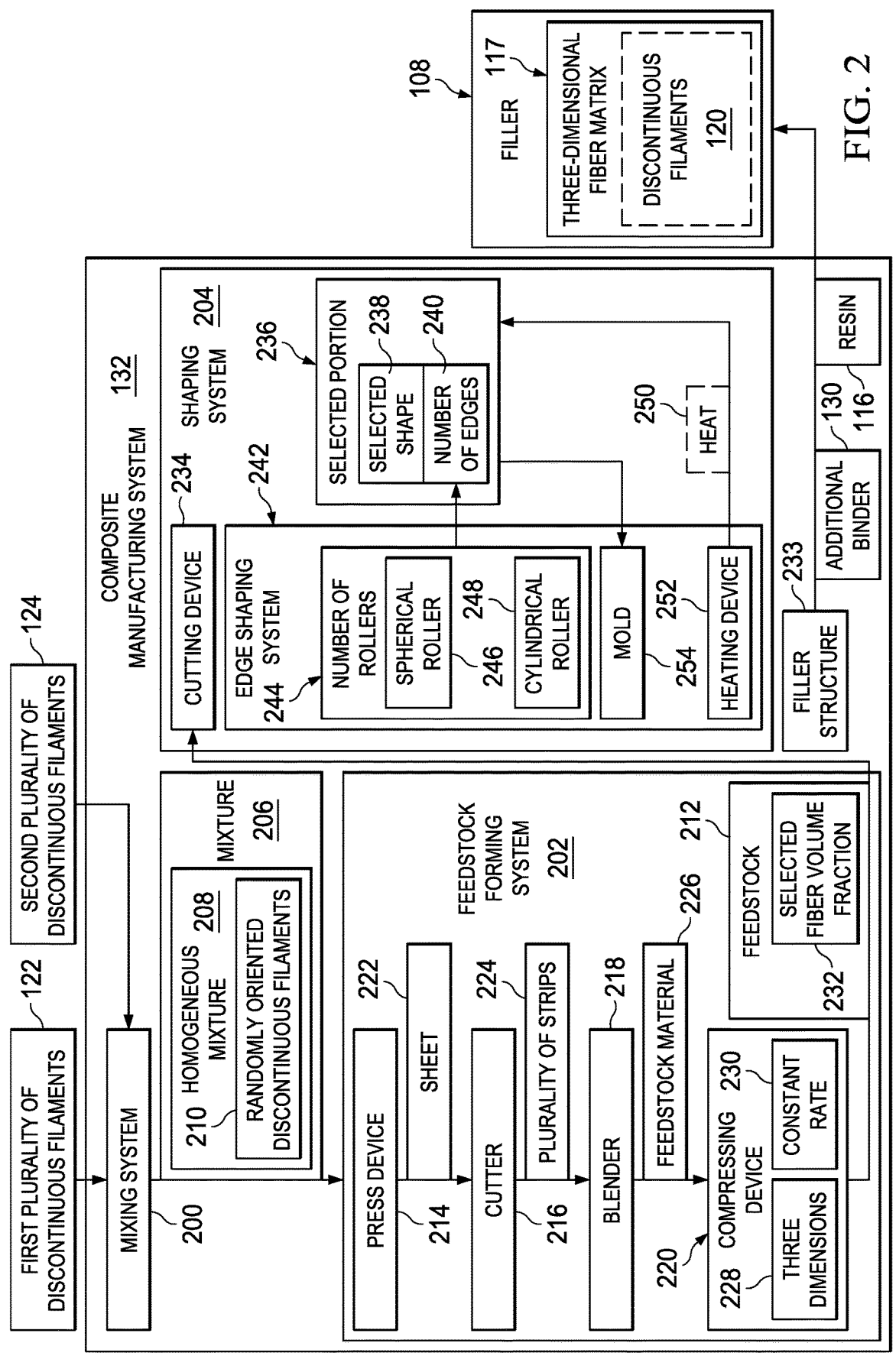
FIG. 2 is an illustration of a composite manufacturing system in greater detail in the form of a block diagram in accordance with an illustrative embodiment.

With reference now to FIG. 2, an illustration of composite manufacturing system 132 from FIG. 2 is depicted in greater detail in the form of a block diagram in accordance with an illustrative embodiment. Composite manufacturing system 132 may be used to manufacture filler 108 using first plurality of discontinuous filaments 122 and second plurality of discontinuous filaments 124. In one illustrative example, composite manufacturing system 132 may include mixing system 200, feedstock forming system 202, and shaping system 204.

Mixing system 200 may be used to mix first plurality of discontinuous filaments 122 and second plurality of discontinuous filaments 124 together to form mixture 206. Mixing system 200 may mix first plurality of discontinuous filaments 122 and second plurality of discontinuous filaments 124 such that mixture 206 is a substantially homogenous mixture 208 comprised of randomly oriented discontinuous filaments 210.

Feedstock forming system 202 may use mixture 206 to form feedstock 212. Feedstock forming system 202 may be implemented in different ways. In one illustrative example, feedstock forming system 202 may include press device 214, cutter 216, blender 218, and compressing device 220.

Press device 214 may form sheet 222 using mixture 206. For example, without limitation, press device 214 may apply pressure to mixture 206 to flatten mixture 206 out to form sheet 222. Sheet 222 may be a thin veil of randomly oriented discontinuous filaments 210.

Cutter 216 may be used to cut sheet 222 into plurality of strips 224. In one illustrative example, the strips in plurality of strips 224 may have substantially uniform shapes and sizes. However, in other illustrative examples, plurality of strips 224 may be of different shapes, different sizes, or both.

Blender 218 may be used to mix plurality of strips 224 together to form feedstock material 226. As one illustrative example, blender 218 may mix plurality of strips 224 at a high speed such that a wad of feedstock material 226 is formed. Feedstock material 226 may be substantially isotropic.

Compressing device 220 may then be used to compress feedstock material 226 to form the final feedstock 212. For example, without limitation, compressing device 220 may compress feedstock material 226 with respect to three dimensions 228 at substantially constant rate 230 to form feedstock 212. In particular, feedstock material 226 may be compressed with respect to three dimensions 228 at substantially constant rate 230 to form feedstock 212 having selected fiber volume fraction 232. In one illustrative example, compression of feedstock material 226 may be performed isotatically, which may mean that equal pressure is applied to all sides of feedstock material 226.

Selected fiber volume fraction 232 may be, for example, without limitation, between about 5 percent and 80 percent. In some cases, selected fiber volume fraction 232 may be preferably between about 20 percent and about 60 percent.

Once feedstock 212 has been fully formed, shaping system 204 may be used to form filler structure 233 using feedstock 212. In one illustrative example, shaping system 204 includes cutting device 234. Cutting device 234 may be used to cut out selected portion 236 of feedstock 212.

For example, without limitation, cutting device 234 may be used to cut away a portion of feedstock 212 such that only selected portion 236 having selected shape 238 remains. Selected shape 238 may be a three-dimensional shape such as, for example, without limitation, a triangular-type prism, a hexagonal-type prism, a cylindrical shape, some other type of polyhedral shape, or some other type of three-dimensional shape.

In some illustrative examples, selected portion 236 of feedstock 212 having selected shape 238 forms filler structure 233. However, in other illustrative examples, number of edges 240 of selected portion 236 of feedstock 212 may need to be further shaped in order to form filler structure 233. Number of edges 240 may be shaped using, for example, edge shaping system 242.

In one illustrative example, edge shaping system 242 may include number of rollers 244. Number of rollers 244 may be rolled along number of edges 240 to shape number of edges 240. Number of rollers 244 may include at least one of spherical roller 246, cylindrical roller 248, or some other type of roller. As one illustrative example, number of rollers 244 may be rolled along number of edges 240, while heat 250 is being applied to number of edges 240 by heating device 252, to shape number of edges 240.

In another illustrative example, edge shaping system 242 may include mold 254. Mold 254 may be comprised of one or more mold pieces. Selected portion 236 of feedstock 212 may be placed into mold 254, which may shape number of edges 240. For example, mold 254 may be shaped such that forcing selected portion 236 of feedstock 212 into mold 254 shapes number of edges 240. Applying heat 250 to selected portion 236 of feedstock 212, while selected portion 236 is in mold 254, may set the shape of each of number of edges 240.

In this manner, filler structure 233 may be formed in a number of different ways. Once filler structure 233 has been formed, in some illustrative examples, additional binder 130 may be injected within filler structure 233. In other illustrative examples, additional binder 130 may be added to blender 218 prior to the mixing of plurality of strips 224 to form feedstock material 226.

Resin 116 may then be impregnated within filler structure 233 to form filler 108. As described in FIG. 1, filler 108 may be formed such that filler 108 has set of filler properties 109 that substantially match set of properties 110 of composite structure 102. Further, filler 108 is formed to reduce or prevent the development of undesired inconsistencies within filler 108.

In other illustrative examples, resin 116 may be impregnated into selected portion 236 of feedstock 212 prior to the shaping of number of edges 240. In this manner, filler structure 233 may or may not include resin 116.

In this manner, composite manufacturing system 132 may be used to manufacture composite structure 102 having filler 108 that fills void 107. Discontinuous filaments 120 may be used to form filler 108 having connectivity propagating in all directions with respect to three dimensions. Three-dimensional fiber matrix 117 comprised of discontinuous filaments 120 may be a three-dimensional network of filaments that may reduce the total amount of fiber required to support filler 108. This reduced amount of fiber may, in turn, reduce the presence of micro-cracking and enable quicker manufacturing processes. For example, it may be easier to fill void 107 between first composite part 105 and second composite part 106, which may be dry preforms, with filler 108 having a lower fiber density.

Additionally, three-dimensional fiber matrix 117 may increase the strength of and reduce the weight of filler 108. Further, filler coefficient of thermal expansion 113 may be reduced and filler coefficient of thermal expansion 113 may be equally present in all directions with respect to three dimensions.

Filler 108 may be uniform in all directions. Consequently, filler 108 may be capable of carrying loads in all directions as needed.

The illustrations of manufacturing environment 100 in FIG. 1 and filler 108 and composite manufacturing system 132 in FIGS. 1-2 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 3:
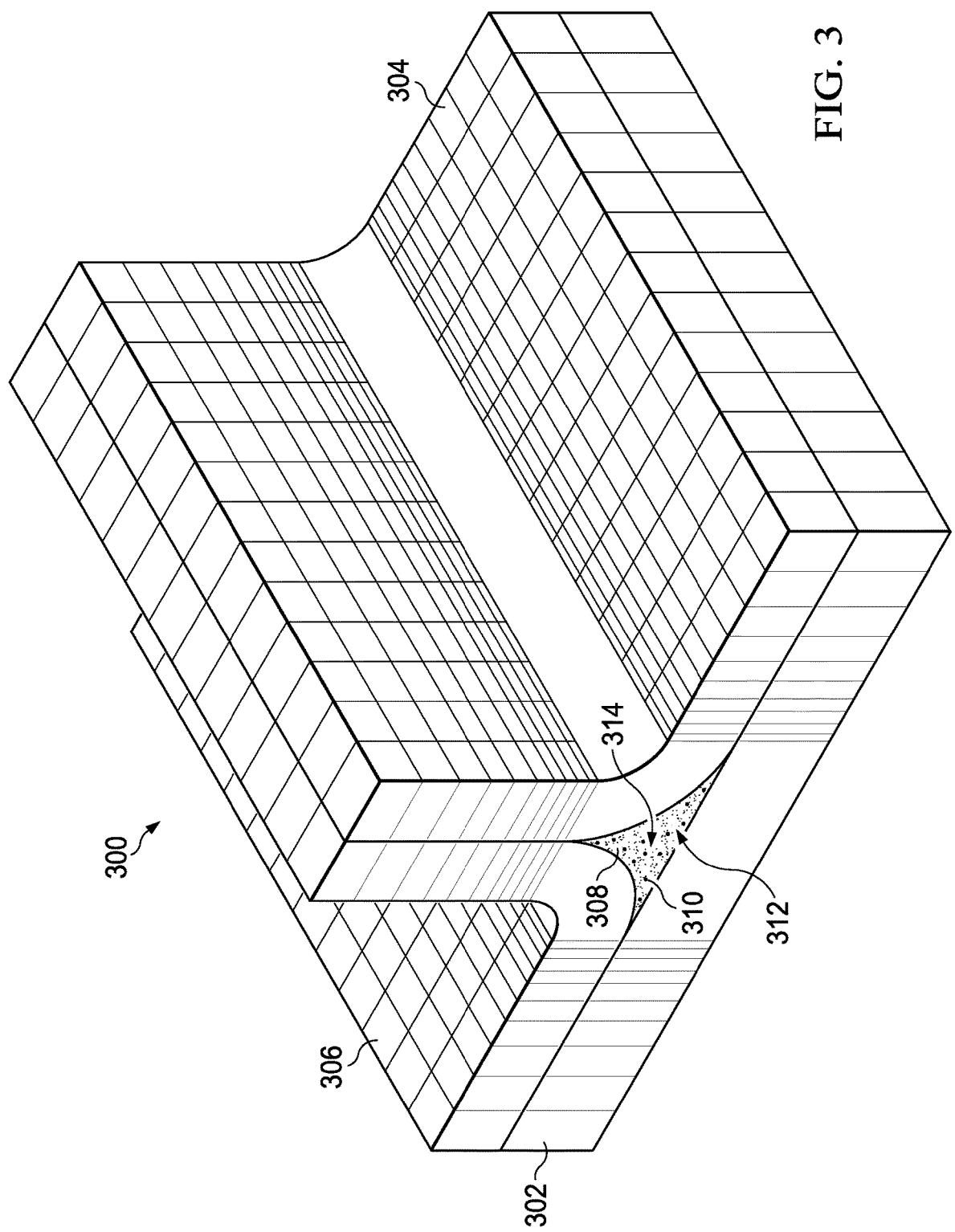
FIG. 3 is an illustration of an isometric view of a composite structure in accordance with an illustrative embodiment.

With reference now to FIG. 3, an illustration of an isometric view of a composite structure is depicted in accordance with an illustrative embodiment. In this illustrative example, composite structure 300 may be an example of one implementation for composite structure 102 in FIG. 1.

As depicted, composite structure 300 may include base 302, part 304, and part 306. Void 308 is created between base 302, part 304, and part 306. Void 308 may be an example of one implementation for void 107 in FIG. 1. In this illustrative example, filler 310 is used to substantially fill void 308. Filler 310 may be an example of one implementation for filler 108 in FIGS. 1-2. Filler 108 may be comprised of fiber matrix 312. Fiber matrix 312 may be comprised of discontinuous filaments 314 that are randomly oriented and entangled with each other such that fiber matrix 312, and thereby filler 310, is substantially isotropic. Fiber matrix 312 and discontinuous filaments 314 may be examples of implementations for fiber matrix 115 and discontinuous filaments 120, respectively, in FIG. 1.

Figure 4:
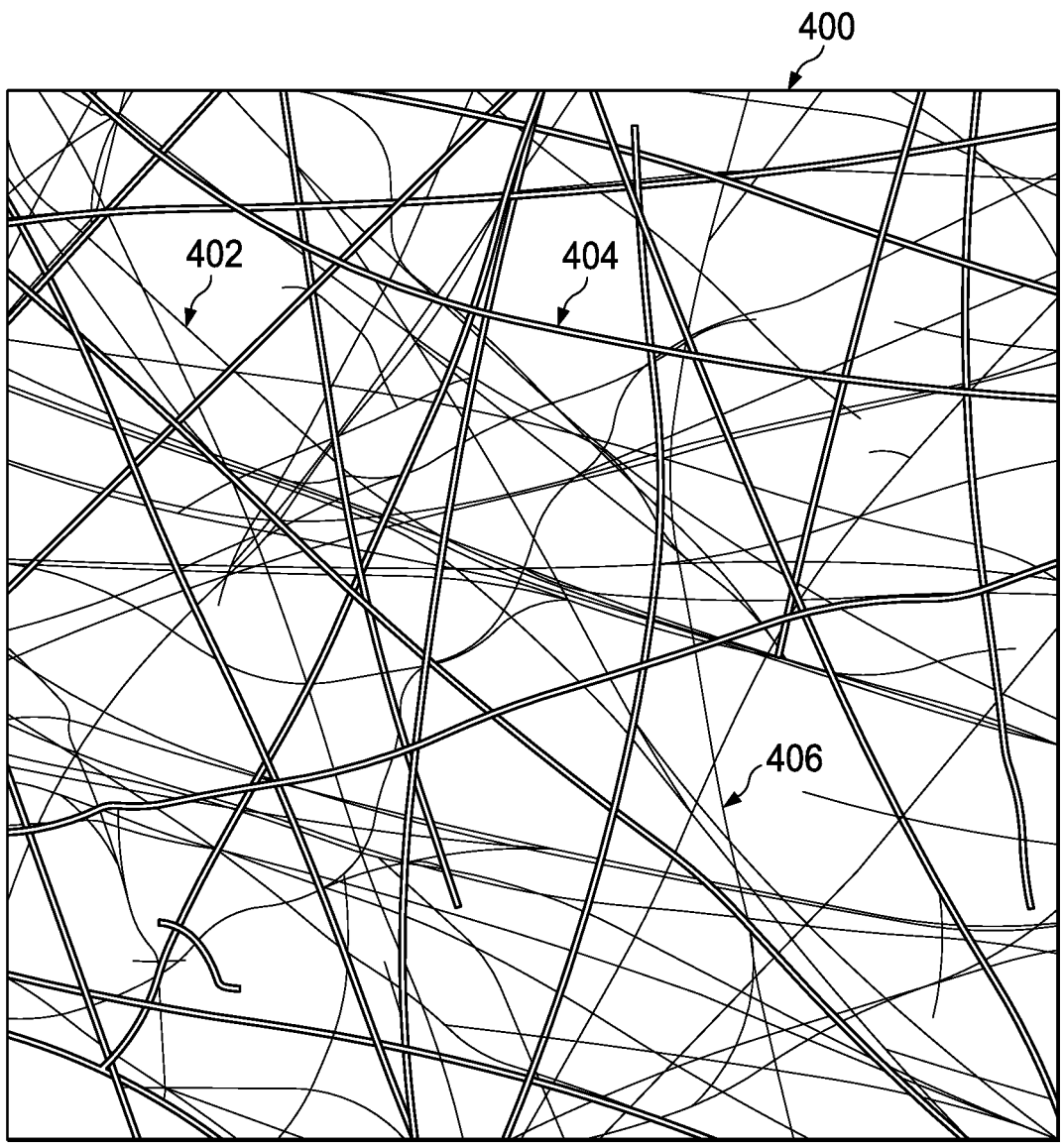
FIG. 4 is an illustration of an enlarged view of a portion of a fiber matrix in accordance with an illustrative embodiment.

With reference now to FIG. 4, an illustration of an enlarged view of a portion of a fiber matrix is depicted in accordance with an illustrative embodiment. Fiber matrix 400 may be an example of one implementation for fiber matrix 115 in FIG. 1. As depicted, fiber matrix 400 may include discontinuous filaments 402, which may be an example of one implementation for discontinuous filaments 120 in FIG. 1.

Discontinuous filaments 402 may include first plurality of discontinuous filaments 404 and second plurality of discontinuous filaments 406. First plurality of discontinuous filaments 404 and second plurality of discontinuous filaments 406 may be examples of implementations for first plurality of discontinuous filaments 122 and second plurality of discontinuous filaments 124, respectively, in FIGS. 1-2.

Figure 5:
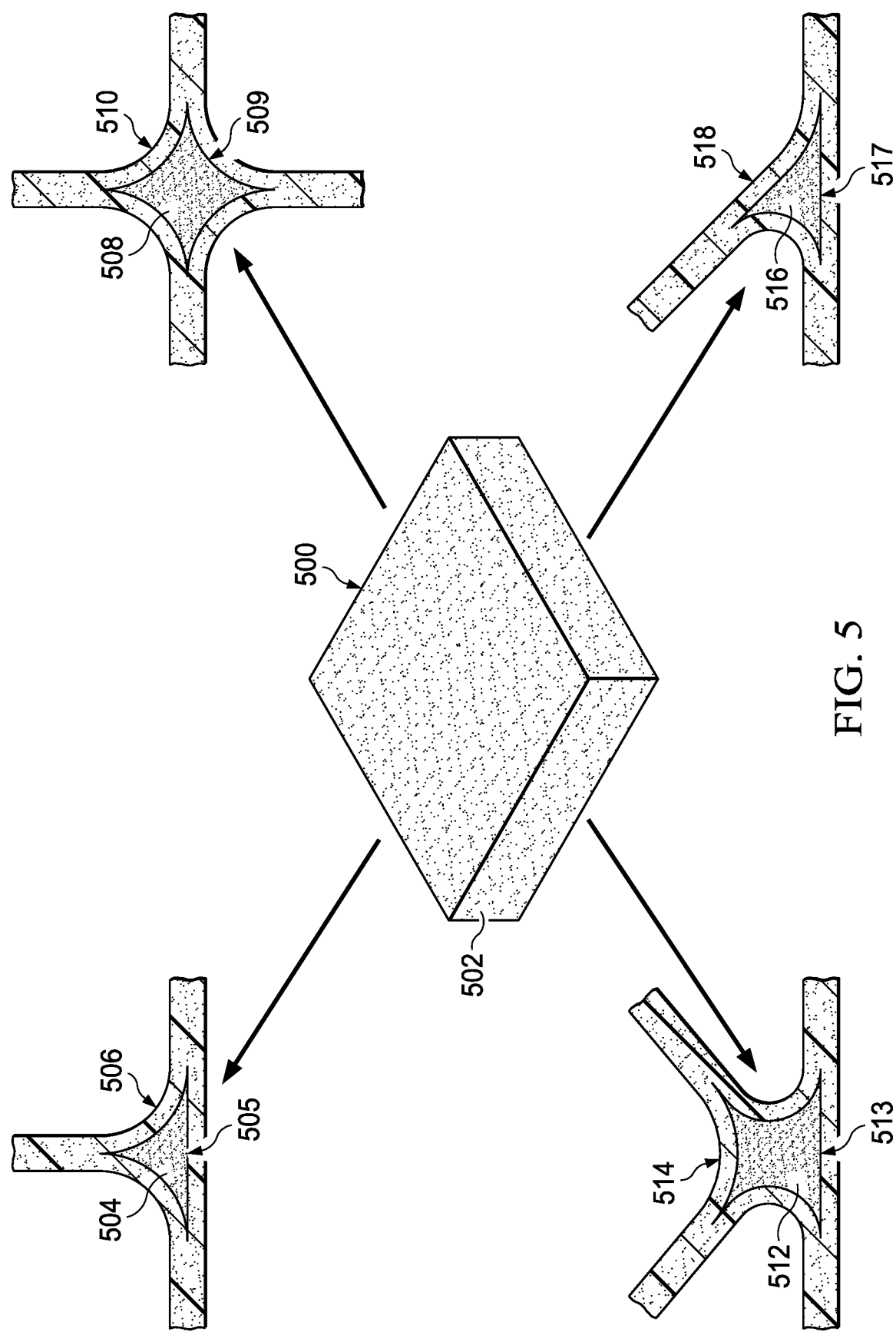
FIG. 5 is an illustration of a feedstock and different types of fillers that may be made from the feedstock in accordance with an illustrative embodiment.

With reference now to FIG. 5, an illustration of a feedstock and different types of fillers that may be made from the feedstock is depicted in accordance with an illustrative embodiment. In this illustrative example, feedstock 500 may be an example of one implementation for feedstock 212 in FIG. 2. Feedstock 500 may be substantially isotropic and comprised of randomly oriented discontinuous filaments 502.

In one illustrative example, filler 504 having selected shape 505 may be formed by cutting out a selected portion from feedstock 500 and impregnating this selected portion with resin. As depicted, filler 504 may be used for filling a void within composite structure 506.

As another illustrative example, filler 508 having selected shape 509 may be formed from feedstock 500 for use in filling a void within composite structure 510. In yet another illustrative example, filler 512 having selected shape 513 may be formed from feedstock 500 for use in filling a void within composite structure 514. Further, filler 516 having selected shape 517 may be formed from feedstock 500 for use in filling a void within composite structure 518. Filler 504, filler 508, filler 512, and filler 516 may each be an example of one implementation for filler 108 in FIGS. 1-2.

Figure 6:
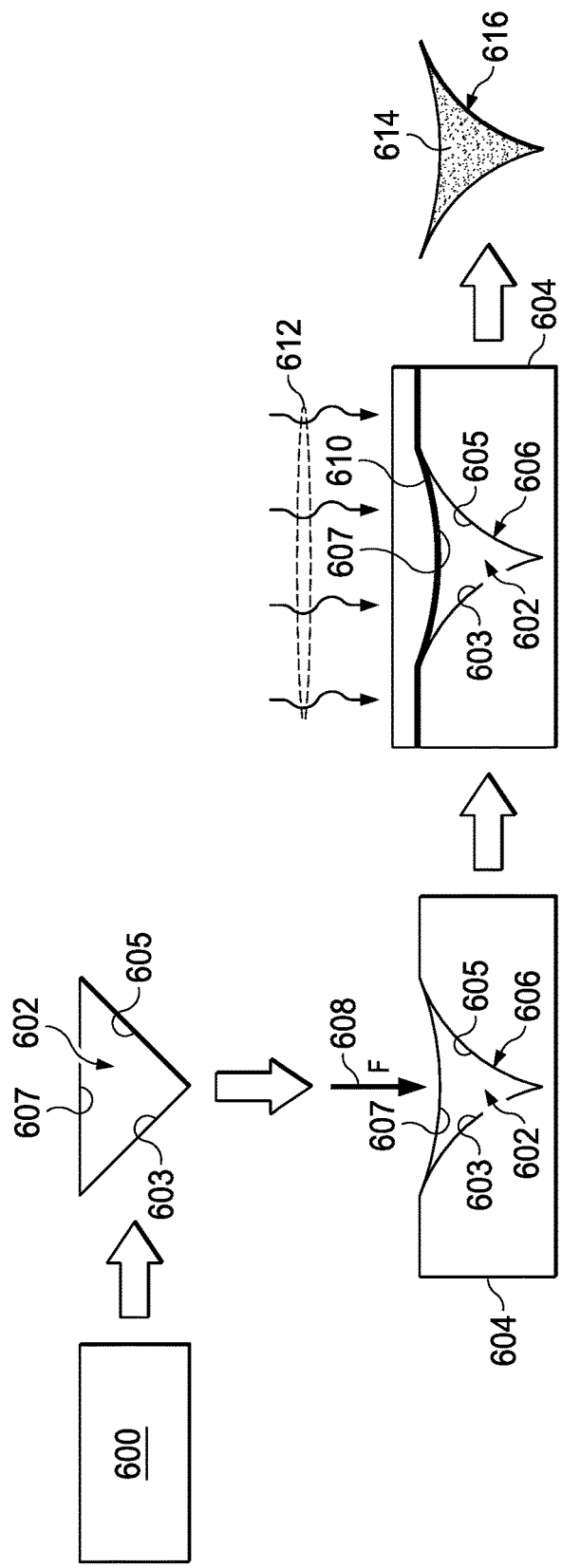
FIG. 6 is an illustration of one manner in which a filler may be formed in accordance with an illustrative embodiment.

With reference now to FIG. 6, an illustration of one manner in which a filler may be formed is depicted in accordance with an illustrative embodiment. In this illustrative example, feedstock 600 may be an example of one implementation for feedstock 212 in FIG. 2.

Selected portion 602 may be cut out from feedstock 600 using a cutting device such as, for example, without limitation, cutting device 234 in FIG. 2. Selected portion 602 may be an example of one implementation for selected portion 236 in FIG. 2.

As depicted, selected portion 602 may include edge 603, edge 605, and edge 607. Resin (not shown) may then be impregnated within selected portion 602.

Selected portion 602 may be pressed into cavity 606 of mold 604 by applying force 608 to edge 607 of selected portion 602. Cavity 606 may be shaped such that forcing selected portion 602 into cavity 606 shapes edge 603 and edge 605. Force 608 applied to edge 607 may also shape edge 607.

Mold 604 may include plate 610 that is placed over edge 607 to maintain the desired shape for edge 607. Heat 612 may then be applied to selected portion 602 within mold 604. Heat 612 may cure selected portion 602 with resin (not shown) infused within selected portion 602 to form filler 614. Filler 614 may have final shape 616.

Figure 7:
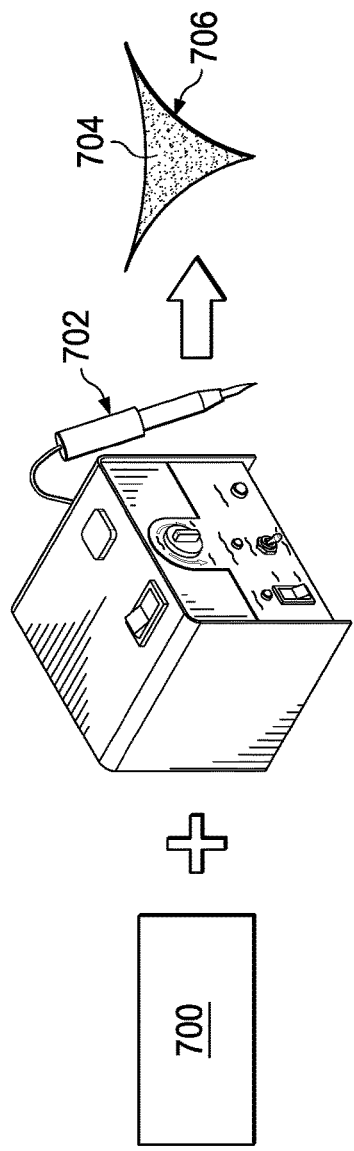
FIG. 7 is an illustration of one manner in which a selected portion of feedstock may be formed in accordance with an illustrative embodiment.

With reference now to FIG. 7, an illustration of one manner in which a selected portion of feedstock may be formed is depicted in accordance with an illustrative embodiment. In this illustrative example, feedstock 700 may be an example of one implementation for feedstock 212 in FIG. 2. Electronic knife 702 may be used to cut out selected portion 704 having selected shape 706 from feedstock 700. Electronic knife 702 may be an example of one implementation for cutting device 234 in FIG. 2.

Figure 8:
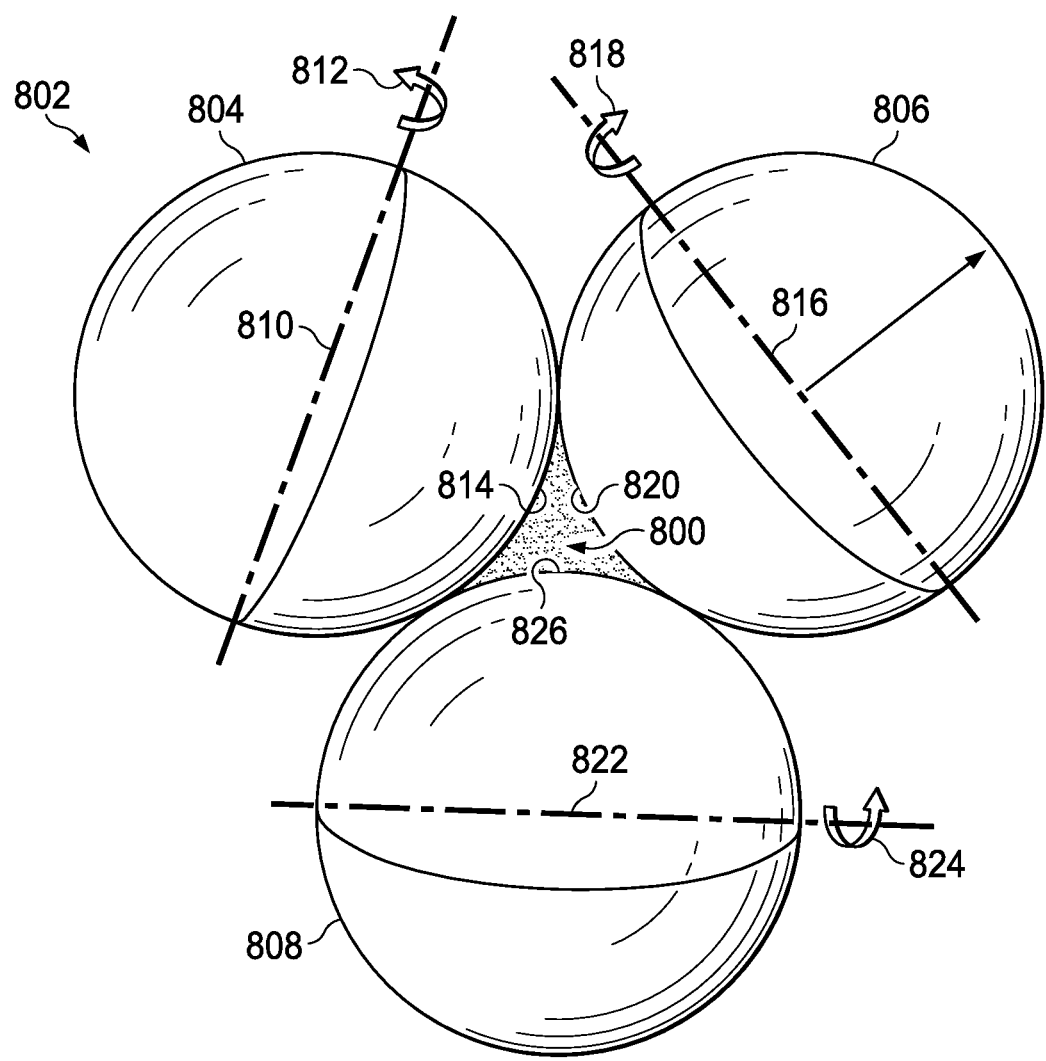
FIG. 8 is an illustration of rollers being used to shape the edges of a selected portion of feedstock in accordance with an illustrative embodiment.

With reference now to FIG. 8, an illustration of rollers being used to shape the edges of a selected portion of feedstock is depicted in accordance with an illustrative embodiment. In this illustrative example, selected portion 800 may be an example of one implementation for selected portion 236 of feedstock 212 in FIG. 2.

Rollers 802 may be an example of one implementation for number of rollers 244 in FIG. 2. Rollers 802 include spherical roller 804, spherical roller 806, and spherical roller 808. In one illustrative example, rollers 802 may be part of a nip roll compression system. Spherical roller 804 may be rotated about axis 810 in the direction of arrow 812 to shape edge 814 of selected portion 800 such that edge 814 substantially conforms to the radius of curvature of spherical roller 804.

Similarly, spherical roller 806 may be rotated about axis 816 in the direction of arrow 818 to shape edge 820 of selected portion 800 such that edge 820 substantially conforms to the radius of curvature of spherical roller 806. Further, spherical roller 808 may be rotated about axis 822 in the direction of arrow 824 to shape edge 826 of selected portion 800 such that edge 826 substantially conforms to the radius of curvature of spherical roller 808.

Figure 9:
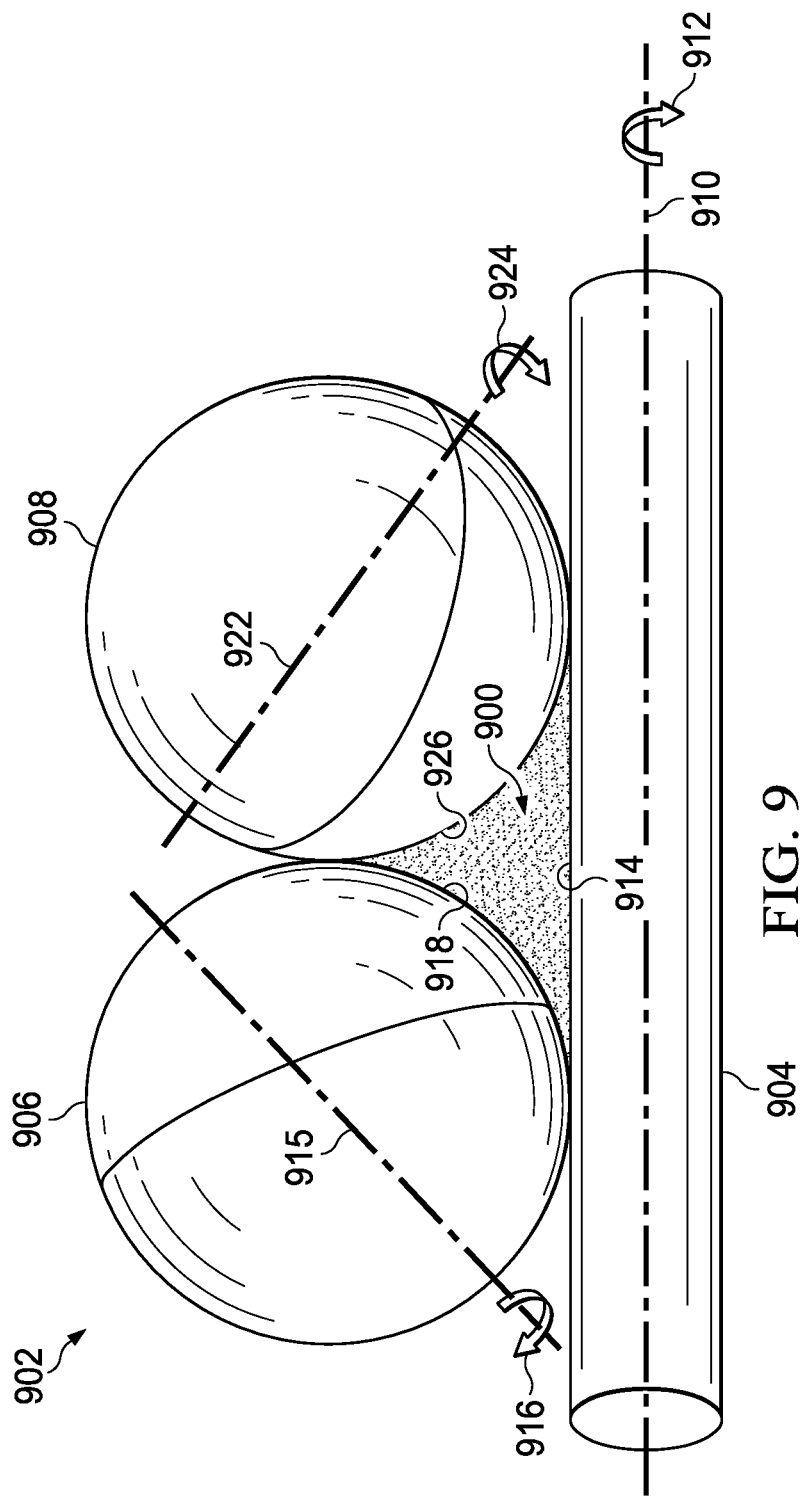
FIG. 9 is an illustration of rollers being used to shape the edges of a selected portion of feedstock in accordance with an illustrative embodiment.

With reference now to FIG. 9, an illustration of rollers being used to shape the edges of a selected portion of feedstock is depicted in accordance with an illustrative embodiment. In this illustrative example, selected portion 900 may be an example of one implementation for selected portion 236 of feedstock 212 in FIG. 2.

Rollers 902 may be an example of one implementation for number of rollers 244 in FIG. 2. In one illustrative example, rollers 902 may be part of a nip roll compression system. Rollers 902 include cylindrical roller 904, spherical roller 906, and spherical roller 908. Cylindrical roller 904 may be rotated about axis 910 in the direction of arrow 912 to shape edge 914 of selected portion 900 such that edge 914 substantially conforms to the radius of curvature of cylindrical roller 904.

Further, spherical roller 906 may be rotated about axis 915 in the direction of arrow 916 to shape edge 918 of selected portion 900 such that edge 918 substantially conforms to the radius of curvature of spherical roller 906. Spherical roller 908 may be rotated about axis 922 in the direction of arrow 924 to shape edge 926 of selected portion 900 such that edge 926 substantially conforms to the radius of curvature of spherical roller 908.

Figure 10:
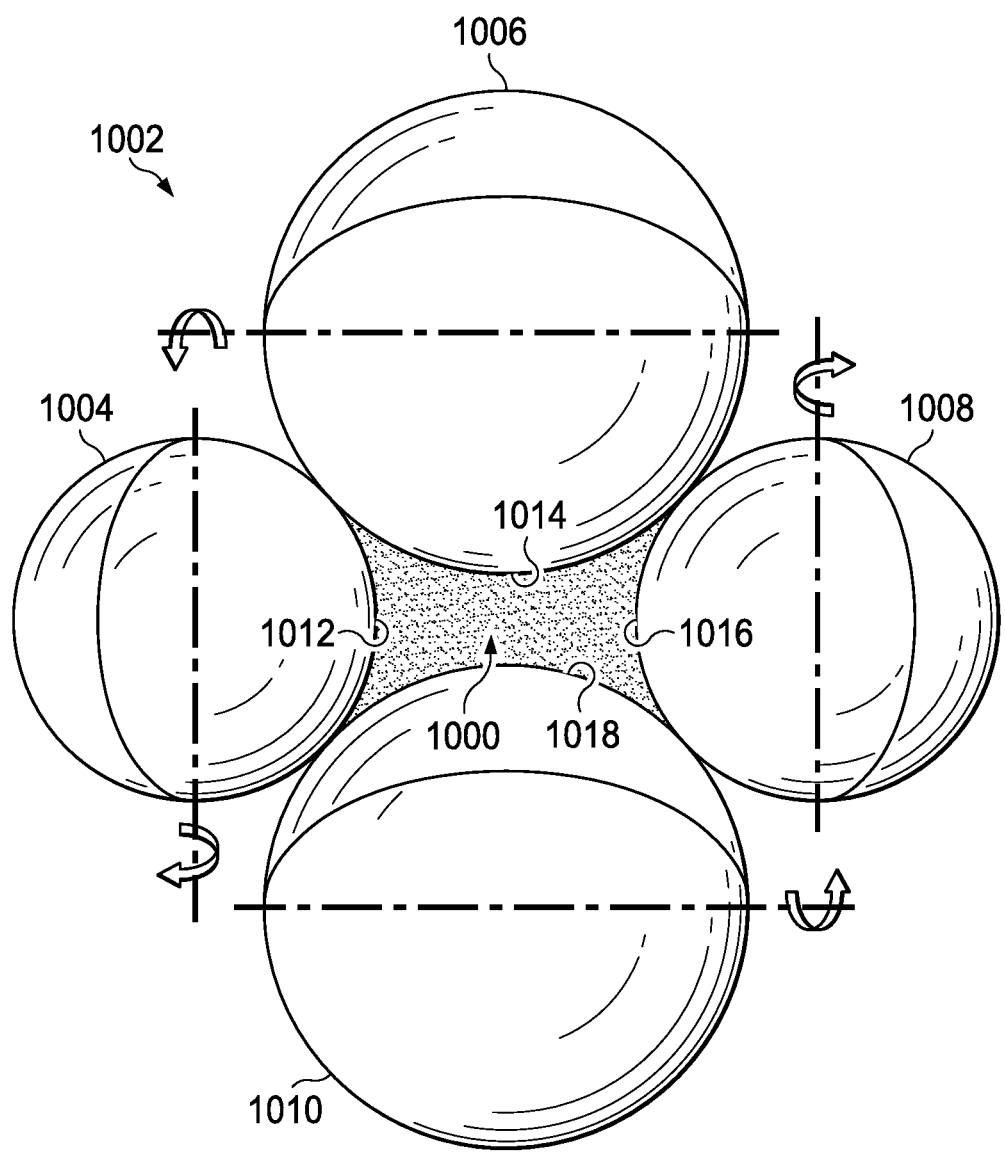
FIG. 10 is an illustration of rollers being used to shape the edges of a selected portion of feedstock in accordance with an illustrative embodiment.

With reference now to FIG. 10, an illustration of rollers being used to shape the edges of a selected portion of feedstock is depicted in accordance with an illustrative embodiment. In this illustrative example, selected portion 1000 may be an example of one implementation for selected portion 236 of feedstock 212 in FIG. 2.

Rollers 1002 may be an example of one implementation for number of rollers 244 in FIG. 2. In one illustrative example, rollers 1002 may be part of a nip roll compression system. Rollers 1002 include spherical roller 1004, spherical roller 1006, spherical roller 1008, and spherical roller 1010. Spherical roller 1004, spherical roller 1006, spherical roller 1008, and spherical roller 1010 may be used to shape edge 1012, edge 1014, edge 1016, and edge 1018, respectively, of selected portion 1000.

The illustrations in FIGS. 3-10 are not meant to imply physical or architectural limitations to the manner in which an illustrative embodiment may be implemented. Other components in addition to or in place of the ones illustrated may be used. Some components may be optional.

The different components shown in FIGS. 3-10 may be illustrative examples of how components shown in block form in FIGS. 1-2 can be implemented as physical structures. Additionally, some of the components in FIGS. 3-10 may be combined with components in FIGS. 1-2, used with components in FIGS. 1-2, or a combination of the two.

Figure 11:
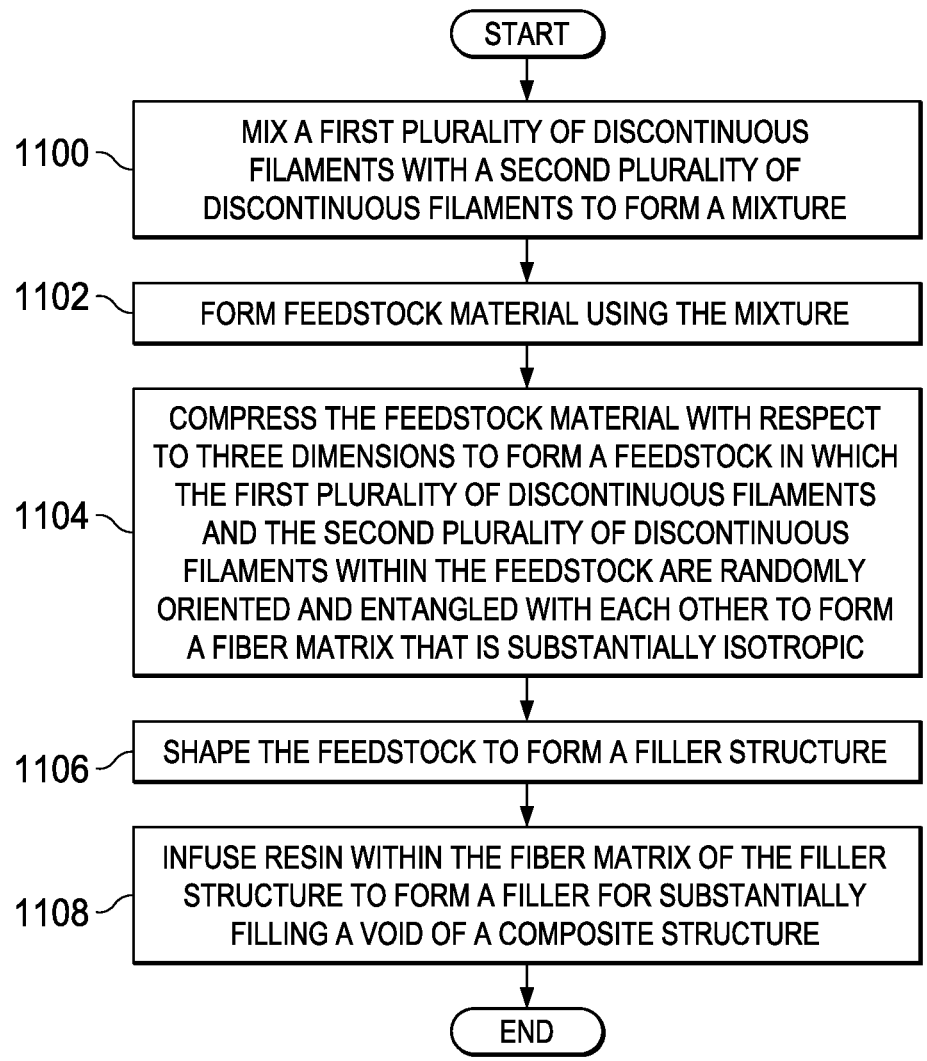
FIG. 11 is an illustration of a process for forming a filler for a void in a composite structure in the form of a flowchart in accordance with an illustrative embodiment.

With reference now to FIG. 11, an illustration of a process for forming a filler for a void in a composite structure is depicted in the form of a flowchart in accordance with an illustrative embodiment. The process illustrated in FIG. 11 may be used to form filler 108 in FIGS. 1-2. In one illustrative example, the process illustrated in FIG. 11 may be implemented using composite manufacturing system 132 in FIGS. 1-2.

The process may begin by mixing a first plurality of discontinuous filaments with a second plurality of discontinuous filaments to form a mixture (operation 1100). In one illustrative example, the mixture formed in operation 1100 may be a homogenous mixture. The homogenous mixture may have a uniform composition and uniform properties. In particular, the first plurality of discontinuous filaments and the second plurality of discontinuous filaments may be substantially uniformly distributed throughout the mixture.

Next, feedstock material may be formed using the mixture (operation 1102). Thereafter, the feedstock material is compressed with respect to three dimensions to form a feedstock in which the first plurality of discontinuous filaments and the second plurality of discontinuous filaments within the feedstock are randomly oriented and entangled with each other to form a fiber matrix that is substantially isotropic (operation 1104).

The feedstock may be shaped to form a filler structure (operation 1106). Resin may then be infused within the fiber matrix of the filler structure to form a filler for substantially filling a void of a composite structure (operation 1108), with the process terminating thereafter.

In some illustrative examples, operation 1108 is not performed. In these examples, the filler structure formed in operation 1106 may form the final filler. This filler may be referred to as a dry filler. This dry filler may be collocated with a first dry preform and a second dry preform to form a composite structure. The dry filler may fill a void between the first dry preform and a second dry preform. Resin may then be infused into the composite structure to form a resin-infused composite structure, which may then be cured to form a fully cured and final composite structure.

Figure 12:
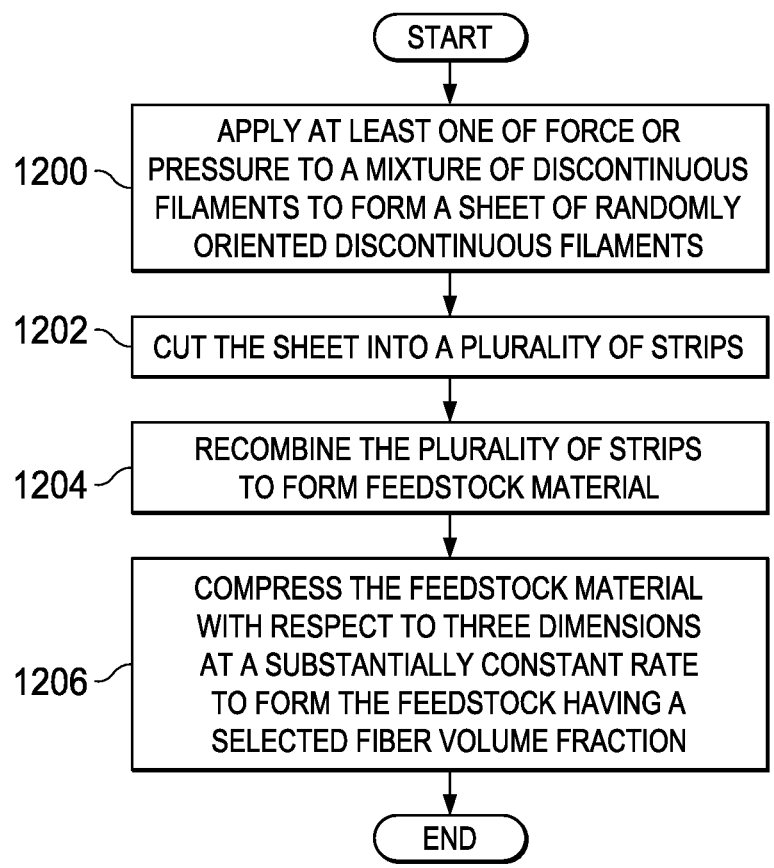
FIG. 12 is an illustration of a process for forming a feedstock in the form of a flowchart in accordance with an illustrative embodiment.

With reference now to FIG. 12, an illustration of a process for forming a feedstock is depicted in the form of a flowchart in accordance with an illustrative embodiment. The process illustrated in FIG. 12 may be an example of one manner in which operation 1102 and operation 1104 in FIG. 11 may be performed. Further, this process may be implemented using, for example, without limitation, feedstock forming system 202 in FIG. 2.

The process may begin by applying at least one of force or pressure to a mixture of discontinuous filaments to form a sheet of randomly oriented discontinuous filaments (operation 1200). In operation 1200, the mixture may be the mixture formed in operation 1100 in FIG. 11. This mixture may be a substantially homogenous mixture.

The sheet may then be cut into a plurality of strips (operation 1202). The plurality of strips may be recombined to form feedstock material (operation 1204). In one illustrative example, operation 1204 may be performed using a blender to blend together the plurality of strips to form feedstock material.

The feedstock material may be compressed with respect to three dimensions at a substantially constant rate to form a feedstock having a selected fiber volume fraction (operation 1206), with the process terminating thereafter. In operation 1206, the selected fiber volume fraction may be, for example, without limitation, between about 5 percent and about 60 percent. In some cases, in operation 1206, the feedstock material may be compressed at a substantially constant rate in directions corresponding to the three dimensions.

Figure 13:
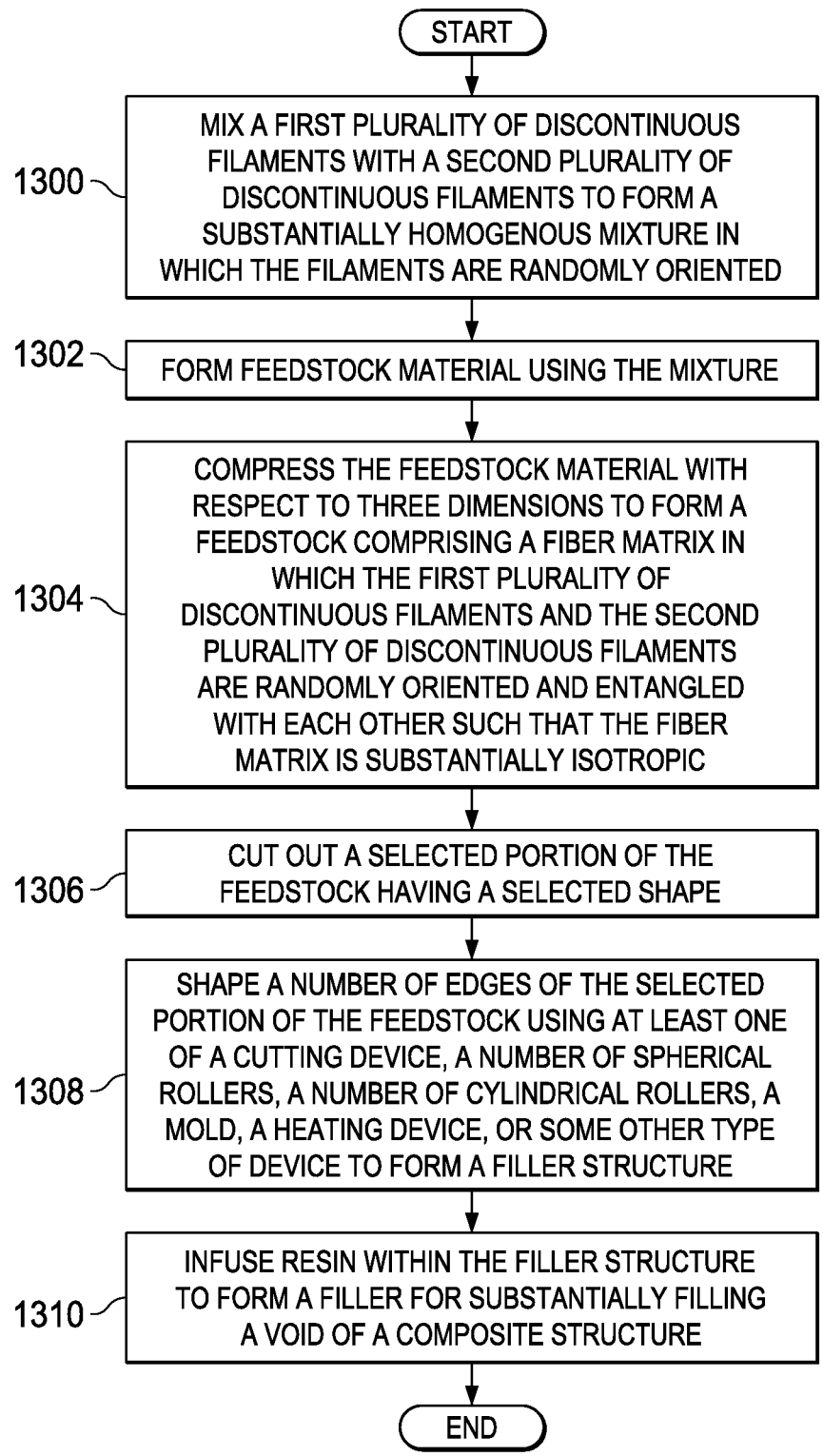
FIG. 13 is an illustration of a more detailed process for forming a filler for a void in a composite structure in the form of a flowchart in accordance with an illustrative embodiment.

With reference now to FIG. 13, an illustration of a more detailed process for forming a filler for a void in a composite structure is depicted in the form of a flowchart in accordance with an illustrative embodiment. The process illustrated in FIG. 13 may be used to form filler 108 in FIGS. 1-2. In one illustrative example, the process illustrated in FIG. 11 may be implemented using composite manufacturing system 132 in FIGS. 1-2.

The process may begin by mixing a first plurality of discontinuous filaments with a second plurality of discontinuous filaments to form a substantially homogenous mixture in which the filaments are randomly oriented (operation 1300). Next, the mixture may be used to form feedstock material (operation 1302).

The feedstock material may be compressed with respect to three dimensions to form a feedstock comprising a fiber matrix in which the first plurality of discontinuous filaments and the second plurality of discontinuous filaments are randomly oriented and entangled with each other such that the fiber matrix is substantially isotropic (operation 1304). The fiber matrix may be a three-dimensional fiber matrix.

A selected portion having a selected shape may then be cut out of the feedstock (operation 1306). A number of edges of the selected portion of the feedstock may be shaped using at least one of a cutting device, a number of spherical rollers, a number of cylindrical rollers, a mold, a heating device, or some other type of device to form a filler structure (operation 1308). Resin may be infused within the filler structure to form a filler for substantially filling a void of a composite structure (operation 1310), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 14:
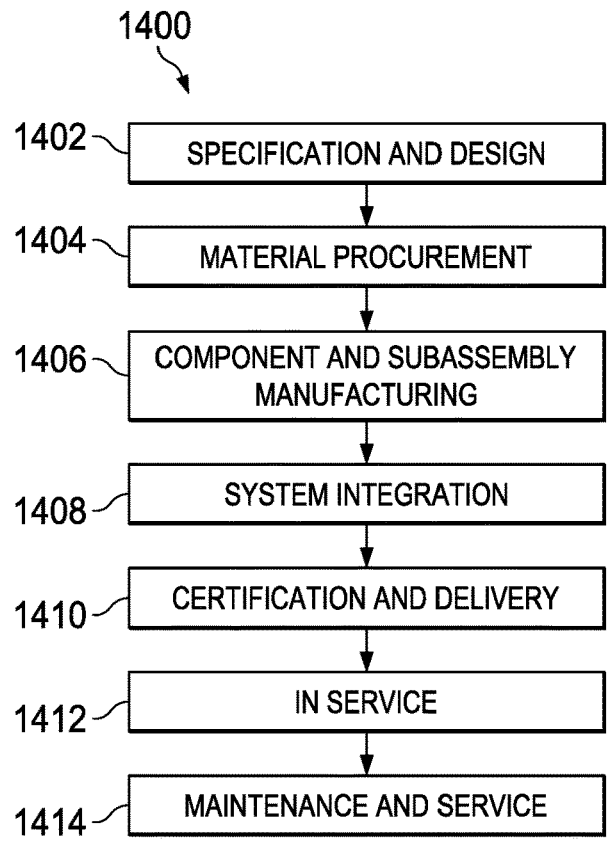
FIG. 14 is an illustration of an aircraft manufacturing and service method in the form of a block diagram in accordance with an illustrative embodiment.
Figure 15:
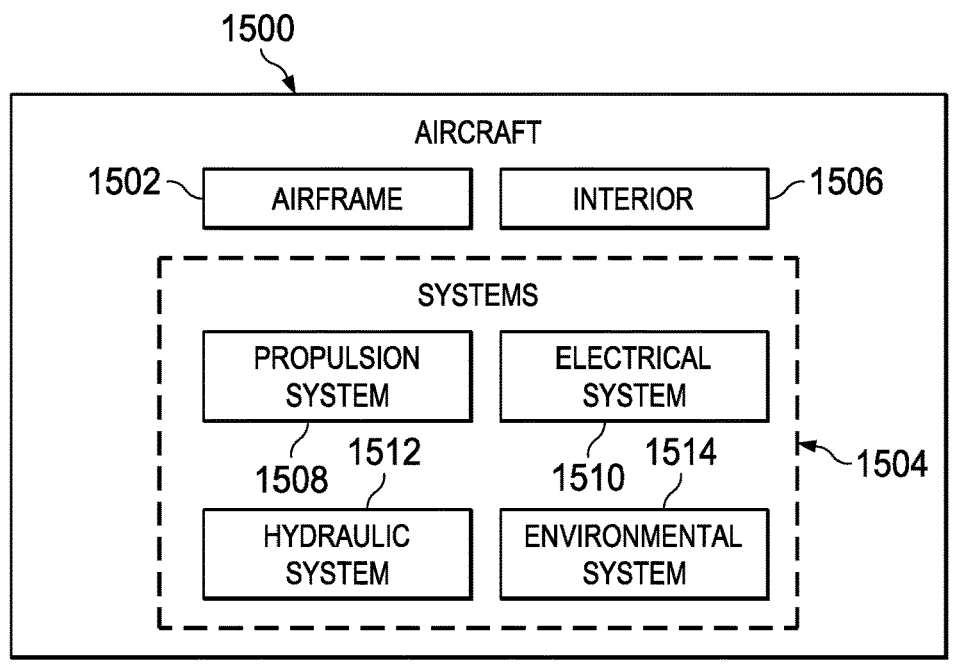
FIG. 15 is an illustration of an aircraft in the form of a block diagram in which an illustrative embodiment may be implemented.

The illustrative embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in the form of a block diagram in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in the form of a block diagram in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

The apparatuses and methods embodied herein may be employed during at least one of the stages of aircraft manufacturing and service method 1400 in FIG. 14. In particular, filler 108 from FIG. 1 may be manufactured and used during any one of the stages of aircraft manufacturing and service method 1400. For example, without limitation, filler 108 from FIG. 1 may be manufactured, used, or both during at least one of material procurement 1404, component and subassembly manufacturing 1406, system integration 1408, routine maintenance and service 1414, or some other stage of aircraft manufacturing and service method 1400. Still further, fillers, such as filler 108 from FIG. 1, may be used to fill voids in composite structures that form airframe 1502 or interior 1506 of aircraft 1500.

In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 is in service 1412 and/or during maintenance and service 1414 in FIG. 14. The use of a number of the different illustrative embodiments may substantially expedite the assembly of and/or reduce the cost of aircraft 1500.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing a filler structure for a composite structure, the method comprising:
  mixing a first plurality of discontinuous filaments with a second plurality of discontinuous filaments to form a mixture of discontinuous filaments that are randomly oriented and entangled with each other;
  forming the mixture into a feedstock material;
  compressing the feedstock material to form a feedstock; and shaping a number of edges of a selected portion of the feedstock using a number of spherical rollers to form the filler structure for use in forming the composite structure.

2. The method of claim 1, wherein mixing the first plurality of discontinuous filaments with the second plurality of discontinuous filaments comprises:
mixing the first plurality of discontinuous filaments comprised of a stiffening material with the second plurality of discontinuous filaments comprised of a binding material.

3. The method of claim 2, wherein mixing the first plurality of discontinuous filaments comprised of the stiffening material with the second plurality of discontinuous filaments comprised of the binding material comprises:
mixing the first plurality of discontinuous filaments with the second plurality of discontinuous filaments to form a substantially homogenous mixture.

4. The method of claim 3, wherein forming the feedstock comprises:
applying at least one of force or pressure to the mixture to form a sheet of randomly oriented discontinuous filaments.

5. The method of claim 4, wherein forming the feedstock material further comprises:
cutting the sheet into a plurality of strips; and
recombining the plurality of strips to form the feedstock material.

6. The method of claim 1, wherein compressing the feedstock material comprises:
compressing the feedstock material with respect to three dimensions at a substantially constant rate to form the feedstock.

7. The method of claim 1, wherein compressing the feedstock material comprises:
compressing the feedstock material with respect to three dimensions to form the feedstock having a selected fiber volume fraction between about 5 percent and about 80 percent, wherein the feedstock is uniform in all directions.

8. The method of claim 1, wherein shaping the feedstock comprises:
cutting out the selected portion of the feedstock having a selected shape.

9. The method of claim 8, wherein shaping the number of edges of the selected portion of the feedstock further comprises:
placing the selected portion of the feedstock into a mold to shape the number of edges of the selected portion of the feedstock; and
applying heat to set the selected portion of the feedstock.

10. The method of claim 1 further comprising:
adding an additional binder into the filler structure to form a filler.

11. The method of claim 10 further comprising:
impregnating the filler structure with a resin to form the filler.

12. The method of claim 1, wherein the number of spherical rollers are part of a nip roll compression system.

13. The method of claim 1, wherein each of the number of spherical rollers are rotated about a respective axis such that the number of edges of the selected portion of the feedstock substantially conforms to a radius of curvature of the number of spherical rollers.

14. The method of claim 2, wherein the stiffening material comprises at least one of carbon, silica, glass, boron, a para-aramid synthetic fiber, a polyimide, a ceramic material, or a metallic material.

15. The method of claim 2, wherein the binding material comprises at least one of a thermoplastic material or a thermoset material.

16. The method of claim 2, wherein the filler is used for substantially filling a void of a composite structure and wherein the filler has a set of filler properties that substantially match a set of properties of the composite structure.

17. The method of claim 2, wherein the filler further comprises:
an additional binder.

18. The method of claim 2, wherein each of the first plurality of discontinuous filaments and the second plurality of discontinuous filaments has a length of at least about one millimeter.

19. A method for manufacturing a filler structure for a composite structure, the method comprising:
forming feedstock material from a mixture of discontinuous filaments;
compressing the feedstock material to form a feedstock of randomly oriented and entangled discontinuous filaments; and
shaping, with a number of spherical rollers, a number of edges of a selected portion of the feedstock to form the filler structure for use in forming a filler.

20. The method of claim 19 further comprising:
impregnating the filler structure with a resin to form the filler.

* * * * *